No. 897,564. PATENTED SEPT. 1, 1908.
F. S. WAHL.
PANEL BOX.
APPLICATION FILED APR. 29, 1907.
3 SHEETS—SHEET 1.
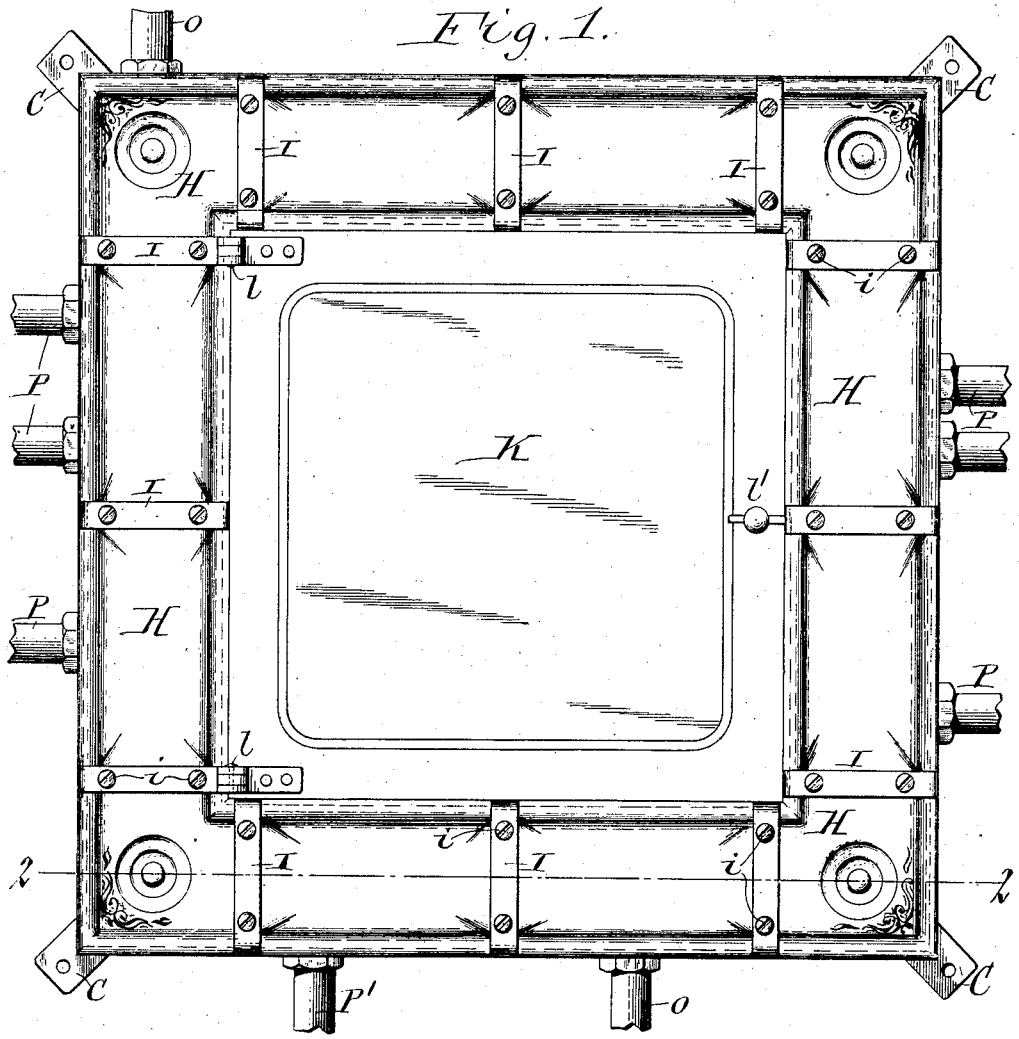
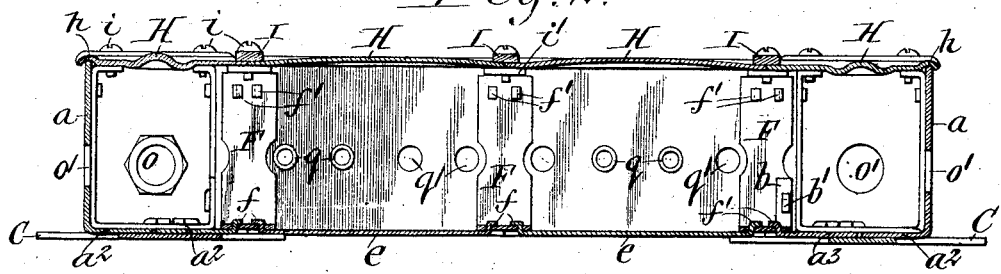

No. 897,564. PATENTED SEPT. 1, 1908.
F. S. WAHL.
PANEL BOX.
APPLICATION FILED APR. 29, 1907.
3 SHEETS—SHEET 2.
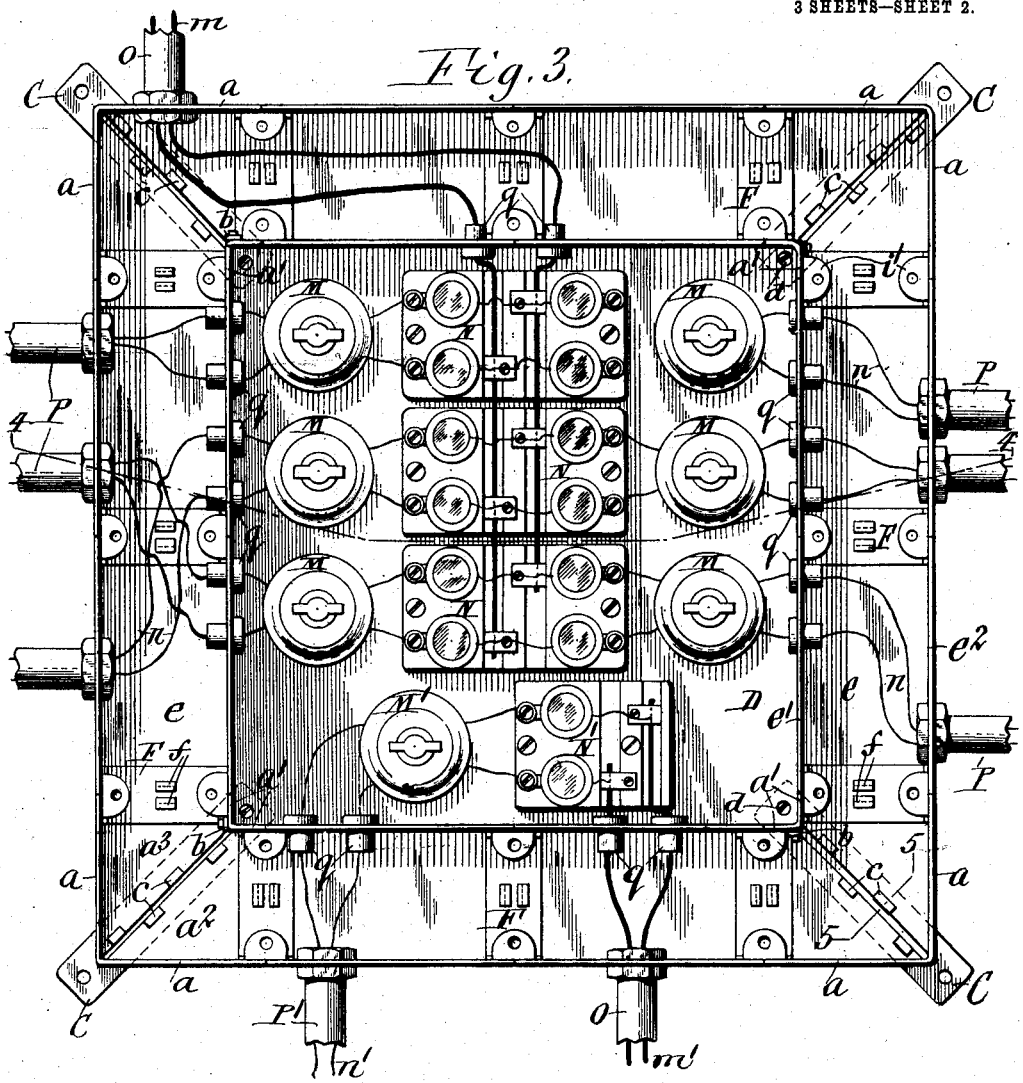
Fig. 3.
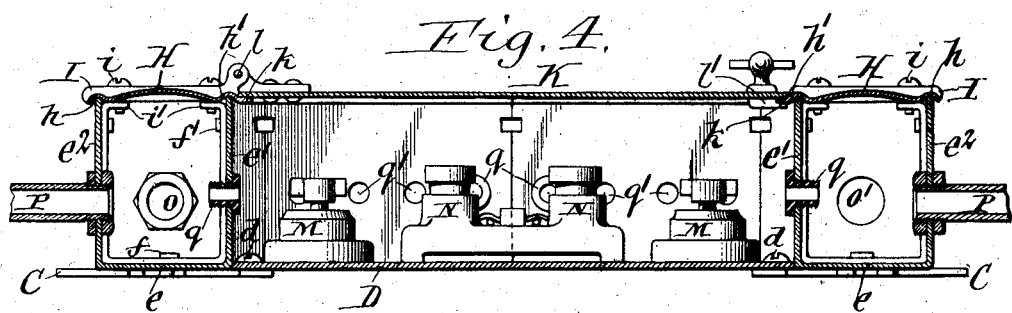
Fig. 4.
Fig. 5.
Witnesses:
Richard Sommer.
Gustav W. Hora.
Inventor
Frank S. Wahl
by Geyer & Popp
Attorneys.

No. 897,564. PATENTED SEPT. 1, 1908.
F. S. WAHL.
PANEL BOX.
APPLICATION FILED APR. 29, 1907.
3 SHEETS—SHEET 3.
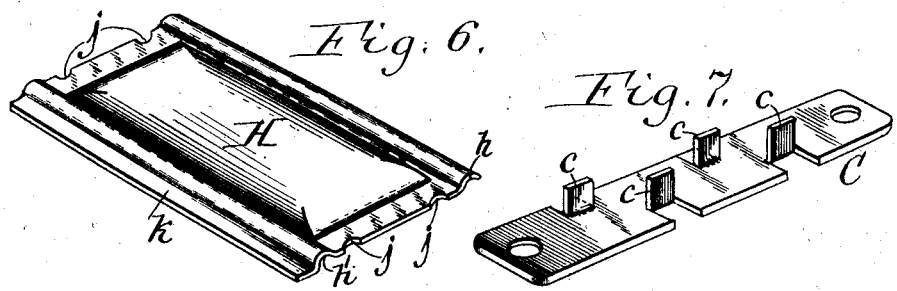
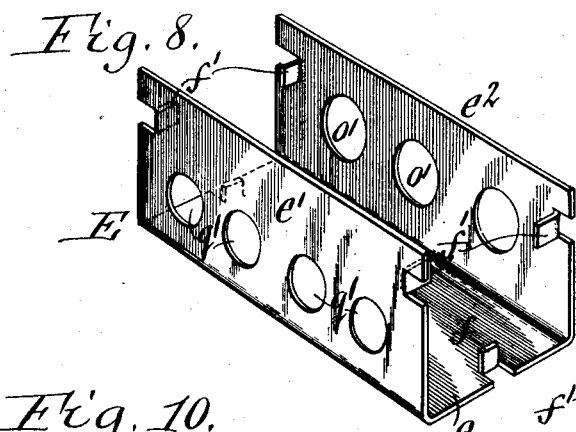
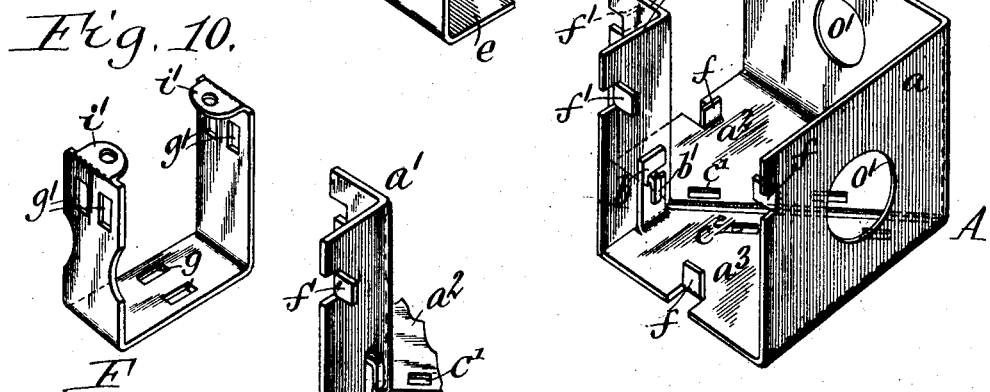
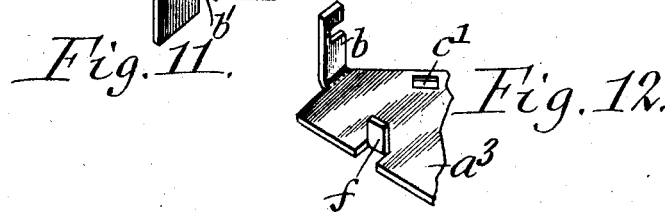
Witnesses:
Richard Sommer.
Gustav W. Hora.
Inventor.
Frank S. Wahl
by Leiper & Popp
Attorneys

UNITED STATES PATENT OFFICE.

FRANK S. WAHL, OF OLEAN, NEW YORK.

PANEL-BOX.

No. 897,564.  Specification of Letters Patent.  Patented Sept. 1, 1908.

Application filed April 29, 1907. Serial No. 370,818.

*To all whom it may concern:*

Be it known that I, FRANK S. WAHL, a citizen of the United States, residing at Olean, in the county of Cattaraugus and State of New York, have invented new and useful Improvements in Panel-Boxes, of which the following is a specification.

This invention relates to that class of electric cut-out or panel boxes in which the compartment containing the switches or cut-outs is surrounded by a closed gutter in which the crossings between the switches or cut-outs and the feed and distributing wires are placed so as to prevent damage to the building or switches in case of fire breaking out in the gutter due to faulty wiring.

Owing to the extensive use of metal conduits for wiring a building with which metal panel boxes are required an electrical contractor or wireman is often seriously hampered in the progress of his work on account of his not having on hand the required size of panel box. To build a panel box for each occasion requires considerable time and skill on the part of the workman and frequently results in much delay and loss to the contractor. It is also often desirable to alter the size of the box after it has been installed owing to unlooked for extensions of the wiring system. It is obvious that in such a case a rigid or one piece box would have to be discarded and replaced by one of the required size.

Therefore the object of this invention is to produce a panel box, cut-out box or cabinet which can be built up in sections with ease and rapidity by a workman of average skill so as to accommodate any desired number of cut-outs and switches.

A panel box of this construction enables a contractor or wireman to meet varying conditions by keeping on hand a comparatively small stock of parts thus reducing the investment which was heretofore necessary for this purpose. It also enables the workman to install the box after all the wires have been drawn into the conduits instead of putting up the box first and drawing the wires afterwards. Furthermore, this sectional construction of panel box renders it possible to increase the size of the same, if required, during the last stages of the work without removing all of the box already in place.

In the accompanying drawings consisting of 3 sheets: Figure 1 is a front elevation of my improved panel box. Fig. 2 is a cross section of the same in line 2—2, Fig. 1. Fig. 3 is a front elevation of my improved panel box with the front or trim thereof removed. Fig. 4 is a cross section in line 4—4, Fig. 3. Fig. 5 is a fragmentary cross section in line 5—5, Fig. 3. Fig. 6 is a perspective view of one of the gutter cover sections. Fig. 7 is a similar view of one of the corner fastening bars or plates. Fig. 8 is a similar view of one of the intermediate or side gutter sections. Fig. 9 is a similar view of one of the corner gutter sections. Fig. 10 is a similar view of one of the straps or pieces for coupling adjacent gutter sections. Figs. 11 and 12 are fragmentary perspective views of two parts of a corner gutter section which are adapted to be interlocked.

Similar letters of reference indicate corresponding parts throughout the several views.

In its general organization, my improved panel box consists of a rectangular gutter-shaped frame or border in which the wiring or crossings are arranged and which forms the sides of the compartment in which the cut-outs and switches are arranged. The gutter frame is constructed of detachable side and corner sections which permits a greater or lesser number of side sections to be assembled to produce a panel box of the required dimensions. Each of these sections is preferably constructed of sheet metal and the body thereof has its bottom and inner and outer walls made in one piece while its cover is made separate from the body and detachably connected therewith.

The body A of each corner section, as shown in Figs. 2, 3, 4, 9, 11 and 12, has two branches arranged at right angles to each other in the form of the letter L and consists of an angular outer wall $a$, an angular inner wall $a^1$ and two bottom portions $a^2$, $a^3$ extending from the rear edge of one angular wall to the rear edge of its companion angular wall. In its preferred form, each corner section is constructed in one piece of sheet metal, the bottom portion $a^2$ being connected at its outer and inner edges with the rear edges of the outer and inner walls of one branch while the other bottom portion $a^3$ is connected only at its outer edge with the rear edge of the outer wall of the other branch and is freely fitted at its inner edge against the inner wall of said last mentioned branch. The joint or division between the two bottom sections preferably extends obliquely from the outer to the inner corner of the corner section.

The inner or narrow end of the bottom portion $a^3$ is provided with an outwardly bent hook $b$ which engages with a lip $b^1$ bent out of the inner wall of the respective branch of the corner piece or section, as shown in Figs. 2, 3, 9, 11 and 12.

Arranged diagonally underneath the corner section and closing the joint between the bottom portions $a^2$, $a^3$ is a supporting and coupling plate or bar C which projects at opposite ends inwardly and outwardly beyond the sides of the corner body section. This supporting plate is provided with a plurality of lugs $c$, which are bent forwardly out of said plate and passed forwardly through openings $c^1$, $c^2$ in the bottom portions $a^2$, $a^3$ and clenched against the front side of the same, as shown in Figs. 2, 3, 5, 7 and 9. The outer ends of the supporting plates are perforated to permit of attaching the same by screws to a wall or support and the inner ends of the same are also perforated and form supports for the back D of the panel box which is secured to said plates by screws $d$ or otherwise. This back may consist of slate, marble, metal, or wood covered with asbestos or sheet metal for protection against fire.

As shown in Figs. 2, 3, 4 and 8, the body E of each side section consists of a flat back or bottom $e$ and inner and outer walls $e^1$, $e^2$ projecting outwardly from the corresponding longitudinal edges of said bottom. As many of these sections are fitted together end to end at the several sides of the panel box as may be necessary to produce a box of the required capacity, and the extremities of these side sections are fitted against the extremities of the branches of the corner sections. At the joints between the several body sections of the gutter the same are connected by a plurality of coupling pieces or straps F. Each of these straps has the form of the letter U, as shown in Fig. 10, and is fitted against the inner side of the gutter so as to extend across the bottom and side joints between two adjacent sections. The strap is secured to the adjacent sections by means of lugs $f, f^1$ which are bent out of the bottom and side walls of said sections and which, after being passed inwardly through bottom and side openings $g$, $g^1$ respectively in the strap, are clenched against the inner side of the same, as shown in Fig. 2.

Each section of the gutter body has a cover H which closes its front side, the covers for the corner sections being L-shaped while those of the side sections are oblong and each section terminates flush with the ends of its respective section. Adjacent to its outer and inner edges each cover section is provided with beads, grooves or channels $h$, $h^1$ which fit over the front edges of the outer and inner walls of the respective gutter body section and hold these parts against lateral displacement relatively to each other. The several cover sections are fastened by a plurality of retaining bars I each of which is arranged transversely across the outer side of the joint between two adjacent cover sections and is secured in place by screws $i$ passing through opposite ends of said retaining bar in line with the joint between two adjacent cover sections and with lips $i^1$ at the upper or front ends of the side bars of the coupling straps F, as shown in Figs. 1, 2, and 4. To permit the passage of the fastening screws $i$ between adjacent ends of the cover sections the latter are provided at their meeting edges with notches $j$, as shown in Fig. 6, which receive said screws.

K represents the door which covers the front side of the compartment of which the gutter forms the sides and which contains the switches and cut-outs. This door may be variously constructed but is preferably made of a sheet of iron which rests at its margin on a ledge formed by inward extensions $k$ on the several gutter cover sections. The door is pivoted at one edge to some of the retaining bars by hinges $l$, while its opposite edge is detachably connected with the ledge of the adjacent cover section by a turn button $l^1$, as shown in Figs. 1 and 4.

Within the compartment are arranged the switches M, $M^1$ and cut-outs N, $N^1$, whereby the main feed lines or wires $m$, $m^1$ are connected and disconnected with the distributing lines or wires $n$, $n^1$. In the drawings, two feed pipes $o$ are shown containing the wires $m$, $m^1$ which it will be assumed are carrying electric currents of different voltage. Each of these feed pipes is secured in one of a number of openings $o^1$ in the outer walls of the gutter body section.

P, $P^1$ represent the distributing pipes which are also secured in openings $o^1$ formed in the outer walls of the gutter and which receive the distributing wires. As shown in the drawings, each corner section is provided with two pipe openings in its outer walls and each side section is provided with three pipe openings.

Six switches M and companion cut-outs N are shown in the drawings for connecting the main lines $m$ with six sets of distributing wires and but a single switch $M^1$ and companion cut-out $N^1$ is shown for connecting the feed wire $m^1$ with a single set of distributing wires $n^1$.

The feed and distributing wires run to and from the switches through insulating bushings $q$ arranged in openings $q^1$ in the inner walls of the gutter, four of such openings being preferably in each side gutter section. The openings in the outer and inner walls of the gutter which are not in use may be closed by plugs or shutters of any suitable construction.

The wiring, splicing or crossing between the wires of different circuits is located in the gutter and as this gutter is constructed of non-combustible material and the space within the gutter is wholly shut-off from communication with the central compartment and also from the surrounding space it is impossible to injure the switches or cut-outs or to burn anything of a combustible character adjacent to the panel box if a blaze or undue heat should be produced in the gutter owing to burning out or short circuiting of wires by reason of faulty wiring.

It will be apparent from the foregoing description of my improved panel box, that the same as a whole may be put in position after the conduits or pipes are in place and the wires have been drawn, or the back may be inserted with or without the switches and cut-outs mounted thereon after the gutters have been placed.

My improved sectional box may be put in position in a recess in the wall and flush with the latter after the pipes are in place.

In the use of my improved panel box it is only necessary to make different sizes of backs and doors for the switch and cut-out compartment inasmuch as the other parts only require to be increased or reduced in number to obtain the desired size of box.

Although I have described my improved gutter panel box as being made mostly of sheet metal it is obvious that most of the parts can be made of cast iron and still retain the essential features of my invention.

I claim as my invention:

1. A panel box having a gutter inclosing frame composed of L-shaped corner sections and straight side sections interposed between the corner sections, substantially as set forth.

2. A panel box having a gutter inclosing frame composed of corner sections and side sections interposed between the corner sections, said corners having L-shaped bodies and covers and said side sections having straight bodies and covers, substantially as set forth.

3. A panel box having an inclosing frame composed of a plurality of gutter sections which are arranged end to end, and means for detachably connecting adjacent sections, substantially as set forth.

4. A panel box having an inclosing frame composed of a plurality of gutter sections which are arranged end to end, and means for detachably connecting adjacent sections consisting of coupling pieces arranged across the joints between said sections and lugs arranged on one of said parts and engaging with openings in the other part, substantially as set forth.

5. A panel box having an inclosing frame composed of a plurality of sheet metal gutter sections which are arranged end to end, and means for detachably connecting adjacent sections consisting of U-shaped coupling pieces arranged with said sections across the joints between the same and having openings, and bendable lugs which are arranged on said sections and which are passed through said openings and clenched against the coupling pieces, substantially as set forth.

6. A panel box having a gutter shaped inclosing frame composed of a plurality of sections arranged end to end, each of said sections having a body consisting of a bottom and side walls projecting forwardly from the side edges of said bottom and also having a cover which rests on the front edges of said side walls, and means for connecting said covers with the bodies comprising retaining bars arranged across the joints between adjacent cover sections, substantially as set forth.

7. A panel box having a gutter shaped inclosing frame composed of a plurality of sections arranged end to end, each of said sections having a body consisting of a bottom and side walls projecting forwardly from the side edges of said bottom and also having a cover which rests on the front edges of said side walls, and means for connecting the bodies and covers of said sections consisting of U-shaped coupling pieces arranged with said body sections across the joints between the same, lugs arranged on the sections and engaging with recesses in said coupling pieces, ears arranged at the front ends of said coupling pieces, retaining bars arranged on the outer side of said cover sections across the joints between the same, and fastening screws connecting said ears and retaining bars and arranged in the joints between the cover sections, substantially as set forth.

8. A panel box comprising a gutter shaped inclosing frame composed of corner sections and side sections arranged end to end, each of said corner sections having its body constructed of an L-shaped outer wall, an L-shaped inner wall, and two bottom portions each of which extends from the rear end of one branch of the outer wall to the rear end of one branch of the inner wall, substantially as set forth.

9. A panel box comprising a gutter-shaped inclosing frame composed of corner sections and side sections arranged end to end, each of said corner sections having its body constructed of an L-shaped outer wall, an L-shaped inner wall, and two bottom portions which join diagonally between the corners of said outer and inner walls and each of which extends from the rear end of one branch of the outer wall to one branch of the inner wall, substantially as set forth.

10. A panel box comprising a gutter-shaped inclosing frame composed of corner sections and side sections arranged end to end, each of said corner sections having its body constructed of an L-shaped outer wall, an L-shaped inner wall, and two bottom portions which join diagonally between the corners of said outer and inner walls and one of said portions being connected on opposite edges with the rear ends of one pair of corresponding side wall branches of the corner section while the other portion is connected on its outer edge with the rear end of the other outer side wall branch and fits at its inner free edge against the rear edge of the other inner side wall branch, substantially as set forth.

11. A panel box comprising a gutter-shaped inclosing frame composed of corner sections and side sections arranged end to end, each of said corner sections having its body constructed of an L-shaped outer wall, an L-shaped inner wall, and two bottom portions which join diagonally between the corners of said outer and inner walls and one of said portions being connected on opposite edges with the rear ends of one pair of corresponding side wall branches of the corner section while the other portion is connected on its outer edge with the rear end of the other outer side wall branch and fits at its inner free edge against the rear edge of the other inner side wall branch, a hook arranged on the free edge of said last mentioned bottom portion, and a lip on the adjacent inner wall branch engaging with said hook, substantially as set forth.

12. A panel box comprising a gutter-shaped inclosing frame composed of corner sections and side sections arranged end to end, each of said corner sections having its body constructed of an L-shaped outer wall, an L-shaped inner wall and two bottom portions which join diagonally between the corners of said outer and inner walls, and supporting bars arranged on the rear side of said frame across the diagonal joints between said corner bottom portions, substantially as set forth.

13. A panel box comprising a gutter-shaped inclosing frame composed of corner sections and side sections arranged end to end, each of said corner sections having its body constructed of an L-shaped outer wall, an L-shaped inner wall and two bottom portions which join diagonally between the corners of said outer and inner walls and which are provided with openings, and supporting bars arranged on the rear side of said frame across the diagonal joints between said corner bottom portions, and bent lugs arranged on said supporting bars and passing through said openings in said bottom portions, substantially as set forth.

14. A panel box comprising a gutter-shaped inclosing frame composed of a plurality of sections, a back for supporting switches and cut-outs arranged within said frame, and supporting bars connecting said frame and back, substantially as set forth.

15. A panel box comprising a gutter-shaped frame composed of a plurality of sections each of which consists of a body and a cover applied to said body and having a ledge at its inner edge, a back arranged within said frame at the rear thereof, and a central door for closing the front of the space within the frame and resting on the ledges of the several gutter covers, substantially as set forth.

16. A panel box comprising a gutter-shaped frame composed of a plurality of sections each of which consists of a body and a cover applied to said body and having a ledge at its inner edge, a back arranged within said frame at the rear thereof, a central door for closing the front of the space within the frame and resting on the ledges of the several gutter covers, retaining bars secured to the outer sides of said gutter covers across the joint between the same, and a pivotal connection between one edge of said central door and retaining bars on one side of said frame, substantially as set forth.

17. A panel box comprising a gutter-shaped frame composed of a plurality of sections each of which consists of a body and a cover applied to said body and having a ledge at its inner edge, a back arranged within said frame at the rear thereof, a central door for closing the front of the space within the frame and resting on the ledges of the several gutter covers, retaining bars secured to the outer sides of said gutter covers across the joint between the same, a pivotal connection between one edge of said central door and retaining bars on one side of said frame, and means for detachably connecting the opposite edge of said central door with the gutter covers on the opposite side of the frame, substantially as set forth.

Witness my hand this 22nd day of April, 1907.

FRANK S. WAHL.

Witnesses:
 THEO. L. POPP,
 E. M. GRAHAM.